(12) United States Patent
Lee

(10) Patent No.: US 6,994,539 B1
(45) Date of Patent: Feb. 7, 2006

(54) MACHINING APPARATUS

(76) Inventor: Mei Hua Lee, No. 55, Beituen Rd., Bei Chiu Taichung (TW) 404

(*) Notice: Subject to any disclaimer, the term of this patent is extended or adjusted under 35 U.S.C. 154(b) by 151 days.

(21) Appl. No.: 10/404,548

(22) Filed: Apr. 2, 2003

(51) Int. Cl.
*B29C 33/24* (2006.01)

(52) U.S. Cl. ............... 425/193; 425/299; 425/306; 425/338; 425/451

(58) Field of Classification Search ............. 425/198, 425/234, 289, 299, 306, 338, 405.1, 451, 425/451.3
See application file for complete search history.

(56) References Cited

U.S. PATENT DOCUMENTS

| | | | | |
|---|---|---|---|---|
| 3,806,296 | A | * | 4/1974 | Aoki ............... 425/576 |
| 5,811,139 | A | * | 9/1998 | Hehl ............... 425/590 |
| 6,773,252 | B2 | * | 8/2004 | Furuhata ........... 425/186 |
| 2002/0110618 | A1 | * | 8/2002 | Tsai et al. ......... 425/574 |
| 2003/0020104 | A1 | * | 1/2003 | Di Dio et al. ...... 264/40.5 |

FOREIGN PATENT DOCUMENTS

EP          1 052 075      * 11/2000

* cited by examiner

*Primary Examiner*—Donald Heckenberg
(74) *Attorney, Agent, or Firm*—Rosenberg, Klein & Lee

(57) ABSTRACT

A machining apparatus for forming and cutting workpieces that can prevent the blade thereon from damages. The machining can also precisely form desired patterns on the workpiece and cut the workpiece to desired shape. The machining apparatus contains: a hydraulic cylinder having a stretchable rod at an upper end, means for adjusting a altitude of the hydraulic cylinder, which is engaged with the hydraulic cylinder at a lower portion thereof and means for restraining the hydraulic cylinder can move only vertically. For each operation the stretchable rod will extend to its full extension. Therefore there is no need to adjust the stretching distance for different workpieces. To avoid the damage of the mold blades by over-pressing the blades, a user can use the means for adjusting an altitude of the hydraulic cylinder to adjust the altitude of the hydraulic cylinder. Thereafter the stretchable rod is fully extended, the mold blades precisely form the patterns on a rubber/plastic plate and also cut a desired shape of the rubber/plastic plate.

10 Claims, 8 Drawing Sheets

MACHINING APPARATUS

TECHNICAL FIELD

This invention relates generally to a machining apparatus, in particular, to provide a machining apparatus that can not only prevent the blade thereon from damage but also precisely form desired patterns on a workpiece and cut the workpiece to desired shape at the same time.

BACKGROUND OF THE INVENTION

A conventional machining apparatus 8 is illustrated in FIG. 10. The machining apparatus is for machining rubber/plastic plates to have desired figures and patterns thereon. A rubber/plastic plate 82 is placed on a second mold blade 81 of a second mold stage 80 and a rubber/plastic plate 92 is placed on a third mold blade 91 of a third mold stage 90. A hydraulic cylinder apparatus 110 placed below the third mold stage 80. The hydraulic cylinder apparatus 110 contains a stretchable rod 111 connected to the third mold stage 80. The second mold stage 80 is raised by the stretchable rod 111 to press against the bottom of the third stage 90. Then the third mold stage 90 is pushed by the second mold stage 80 to press against the bottom of the first mold stage 100, which is fixed at the machining apparatus. When the rubber/plastic plate 82, 92 are pressed, the mold stages 80, 90, 100 are heated to soften the rubber/plastic plate 82, 92. Thereby, the mold blades 81, 91 cut and form desired patterns on the rubber/plastic plate 82, 92.

The sizes of the mold blades 81, 91 need to be exchanged to fit different rubber/plastic plates. Therefore the stretching distance of the stretchable rod need to be adjusted depends on different rubber/plastic plates. The stretching distance of the stretchable rod 11 is controller by a controller of a hydraulic cylinder system. However, the volume of the oil within the hydraulic cylinder apparatus 110 varies when the surrounding temperature varies. Accordingly the stretching distance is difficult to be precisely controlled. When the actual stretching distance is longer than desired stretching distance, the mold blades 81, 91 will be over-pressed and therefore damaged. To avoid damages of the mold blades, users will usually set the stretching distance a little shorter than desired stretching distance. The patterns still can be formed by the mold blade 81, 91 but the edges of the mold blades 81, 91 cannot cut through the rubber/plastic plates 82,92 to desired shapes. Therefore another processing machine is needed to cut the rubber/plastic plates 82,92 to desired shapes. The cost of the manufacture is increased because of the additional machine and the qualities of the products are not good because the manufacturing process cannot be completed within one machine.

Therefore a machining apparatus that can avoid damages of the mold blades and also can precisely cut the raw material such as rubber or plastic plates to desired shape and have desired patterns thereon is needed.

SUMMARY OF INVENTION

It is therefore an objective of the present invention to provide a machining apparatus that can avoid damages of the mold blades thereon.

Another object of the invention is to provide a machining apparatus that can precisely form patterns on a rubber/plastic plate and also cut the rubber/plastic plate to desired shape at the same time.

The present invention, briefly summarized, in one embodiment discloses a machining apparatus. The machining apparatus contains: a hydraulic cylinder having a stretchable rod at an upper end, means for adjusting an altitude of the hydraulic cylinder, which is engaged with the hydraulic cylinder at a lower portion thereof and means for restraining the hydraulic cylinder can move only vertically. The stretchable rod has a fixed full stretching distance and for each operation the stretchable rod extends to full distance. Therefore there is no need to adjust the stretching distance for different workpieces. To avoid the damage of the mold blades by over-pressing the blades, a user can use the means for adjusting an altitude of the hydraulic cylinder to adjust the altitude of the hydraulic cylinder. Thereafter the stretchable rod fully extends and the mold blades precisely form the patterns on a rubber/plastic plate and also cut a desired shape of the rubber/plastic plate.

BRIEF DESCRIPTION OF DRAWINGS

The invention will be more clearly understood after refer to the following detailed description read in conjunction with the drawings wherein.

DETAILED DESCRIPTION OF PREFERRED EMBODIMENTS

Figure 1:
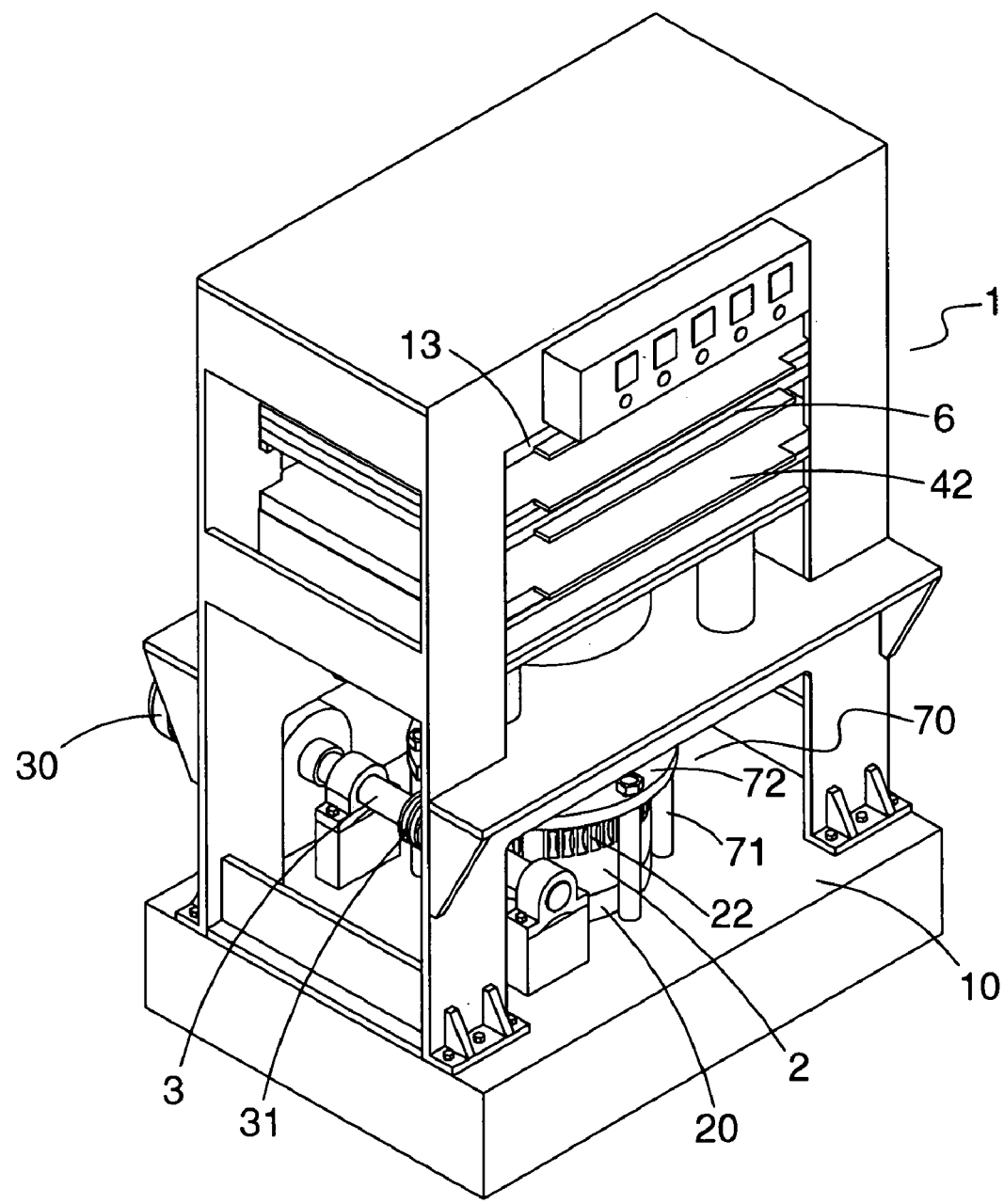
FIG. 1 is a perspective view of an embodiment.

The present invention adjusts the altitude of the hydraulic cylinder to fit operations of workpieces of different thickness in stead of controlling the stretchable rod's stretching distance of a hydraulic cylinder, which is difficult to control.

With reference to FIG. 1 to FIG. 5 and FIG. 7, numeral 1 represents a machining apparatus. The machining apparatus mainly contains: a base 10, a seat 11, a ring 20, a gear 2, a spiral rod 3, a hydraulic cylinder 4, and a restriction means 5.

The seat 11 having a flange 12 at an upper portion. The seat 11 is mounted to the base 10. The ring 20 surrounds the seat 11. The gear 2 has teeth 22 at an outer surface thereof and a threaded hole 21 therein. The ring 20 is restrained by the flange 12 in the vertical direction. The gear 2 is mounted with the ring 20, so the gear 2 is also restricted in the vertical direction. The gear has a stage formed on a top thereof. A holding device 70 has plural pillars 71 fixed on the base 10 and a holding ring 72 mounted with the pillars and holding the stage of the gear 2. The holding device is to further restrain the vertical movement of the gear 2.

Figure 2:
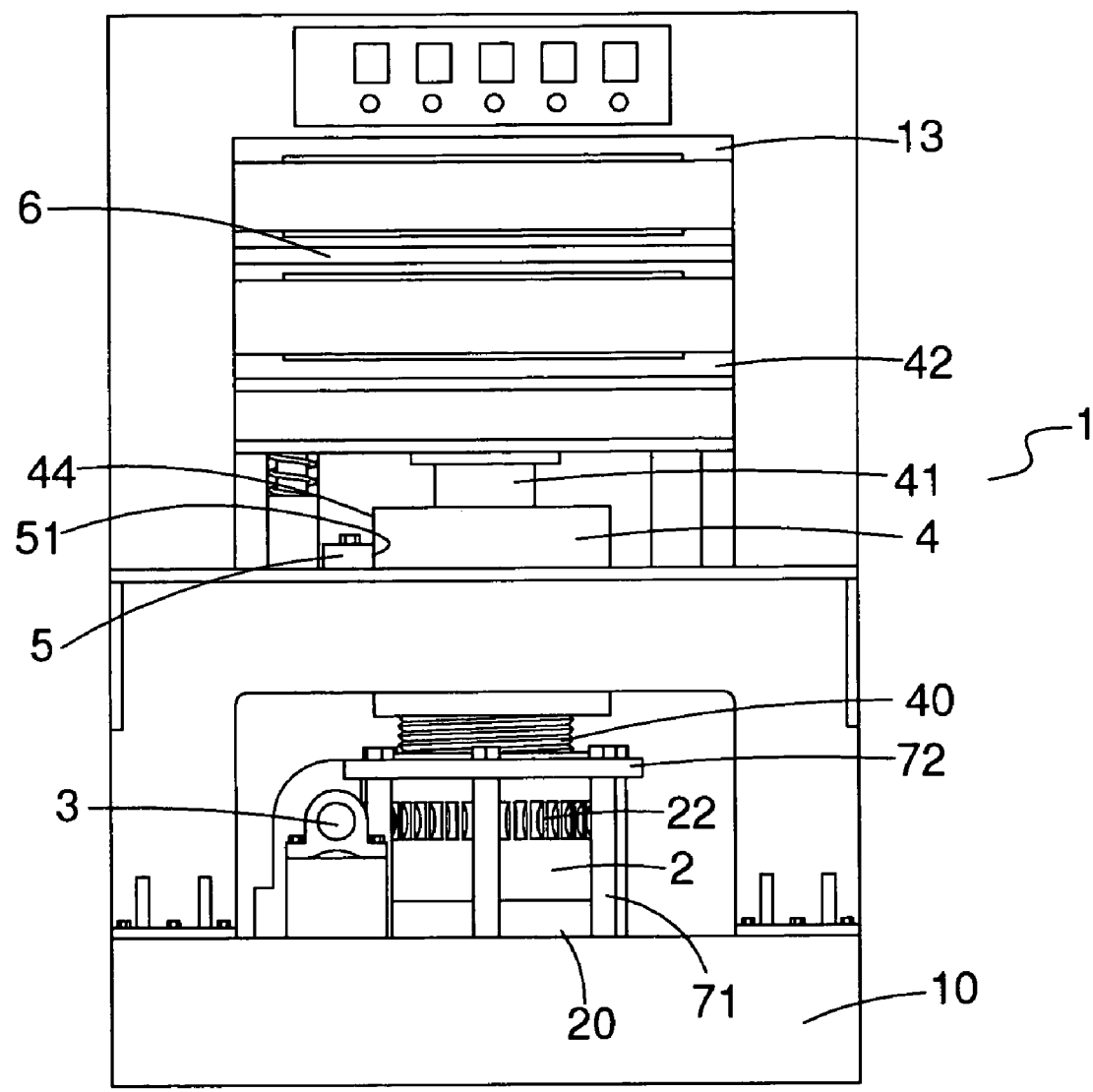
FIG. 2 is a front elevational view of the embodiment.
Figure 3:
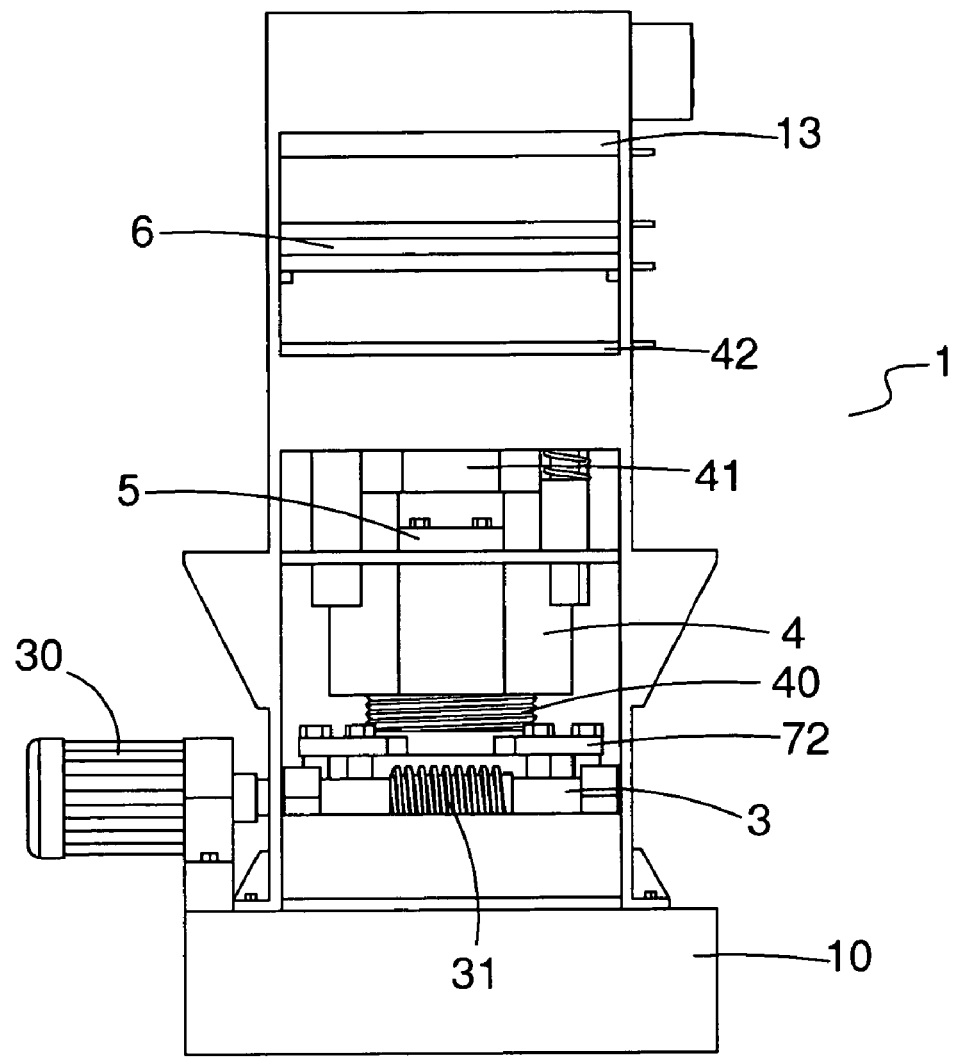
FIG. 3 is a left side view of the embodiment.
Figure 4:
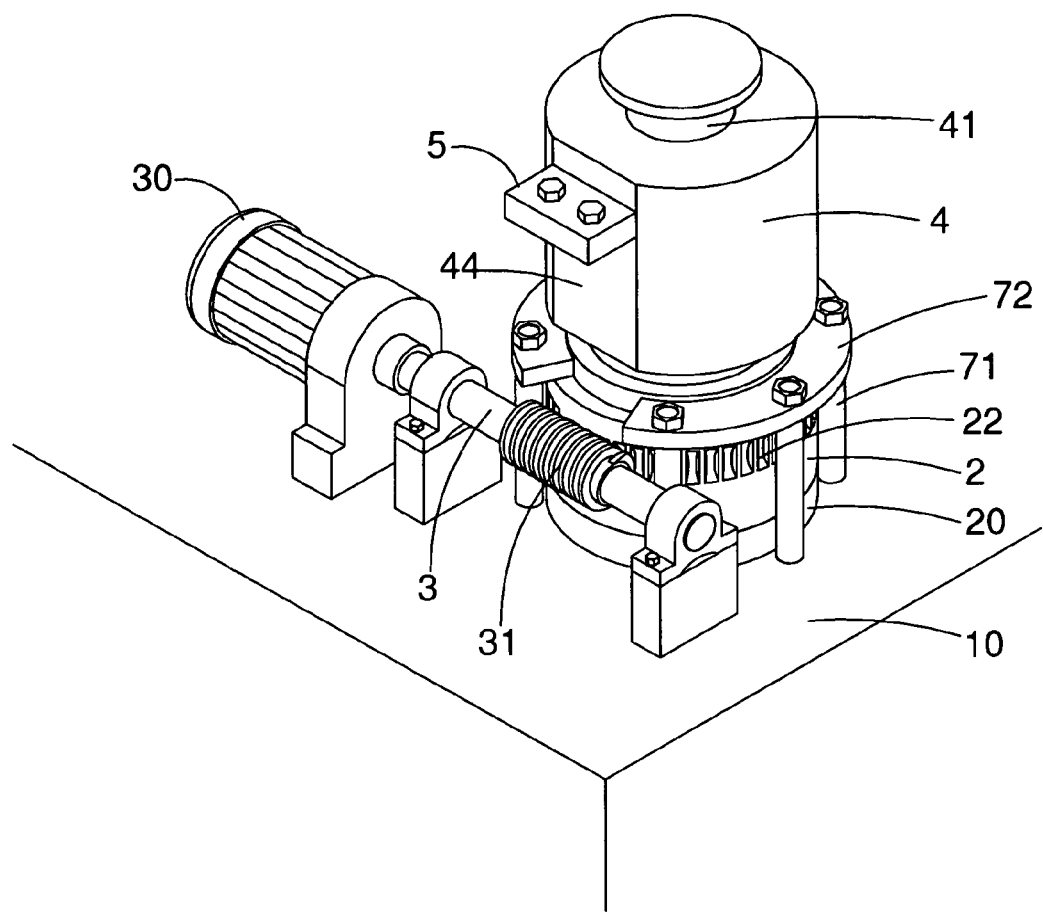
FIG. 4 is a perspective view showing assembled spiral rod, gear and hydraulic cylinder.
Figure 7:
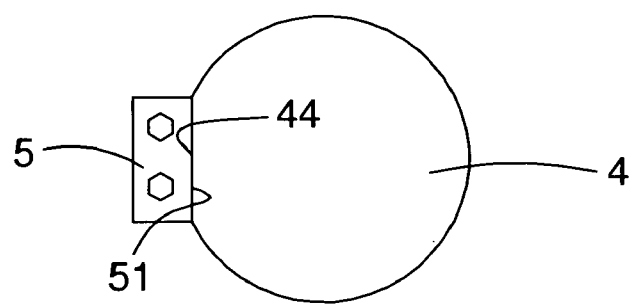
FIG. 7 is a perspective view showing a meanings for restraining the hydraulic cylinder can move only vertically is engaged with a flat surface of the hydraulic cylinder.
Figure 8:
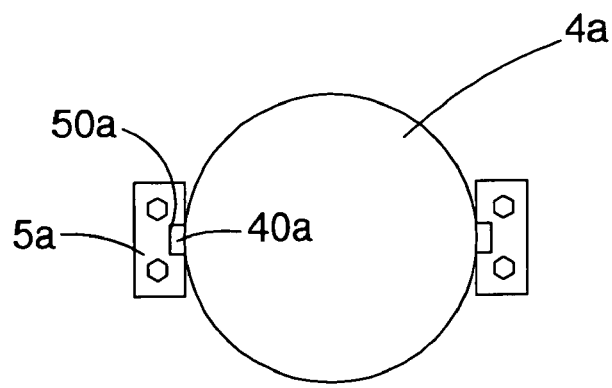
FIG. 8 is a perspective view showing another meanings for restraining the hydraulic cylinder can move only vertically, which is engaged with the hydraulic cylinder.

The spiral rod 3 has spiral teeth 31 at one end. The spiral teeth 31 are engaged with the teeth 22 of the gear 2. The spiral rod 3 is driven by a motor 30. The hydraulic cylinder 4 has a stretchable rod 41 at an upper end thereof and a treaded portion 40 at a lower end thereof. The hydraulic cylinder 4 has a flat surface 44. The treaded portion 40 is engaged with the treaded hole 2. The restriction means 5 is fixed on a frame of the machining apparatus 1 as shown in FIG. 2 and has a flat surface 51 thereon. With reference to FIG. 7, the flat surface 51 of the restriction means 5 engage with the flat surface 44 of the hydraulic cylinder. Thereby the hydraulic cylinder 4 cannot rotate but move in the vertical directions. Another embodiment of restriction means 5a is shown in FIG. 8. The restriction means 5a has a groove 40a at one side. The hydraulic cylinder 4a has a rail 40a thereon. The rail 40a can only move vertically within the groove 50a.

There are three mold stages in the embodiment. The second mold stage 42 mounted on top of stretchable rod 41 of the hydraulic cylinder 4. The third mold stage 6 is placed above the second stage 42. The first mold stage 13 is placed above the third mold stage 6. A second mold blade 43 is installed on the second mold stage 42 and a third mold blade 60 is installed on the third mold stage 6. A second workpiece 45 is placed on top of the second mold blade 43 and a third workpierce 61 is placed on the third mold blade 60. The first mold stage is fixed at a frame of the machining apparatus 1. The second and third mold stage 42, 6 are not fixed.

Figure 5:
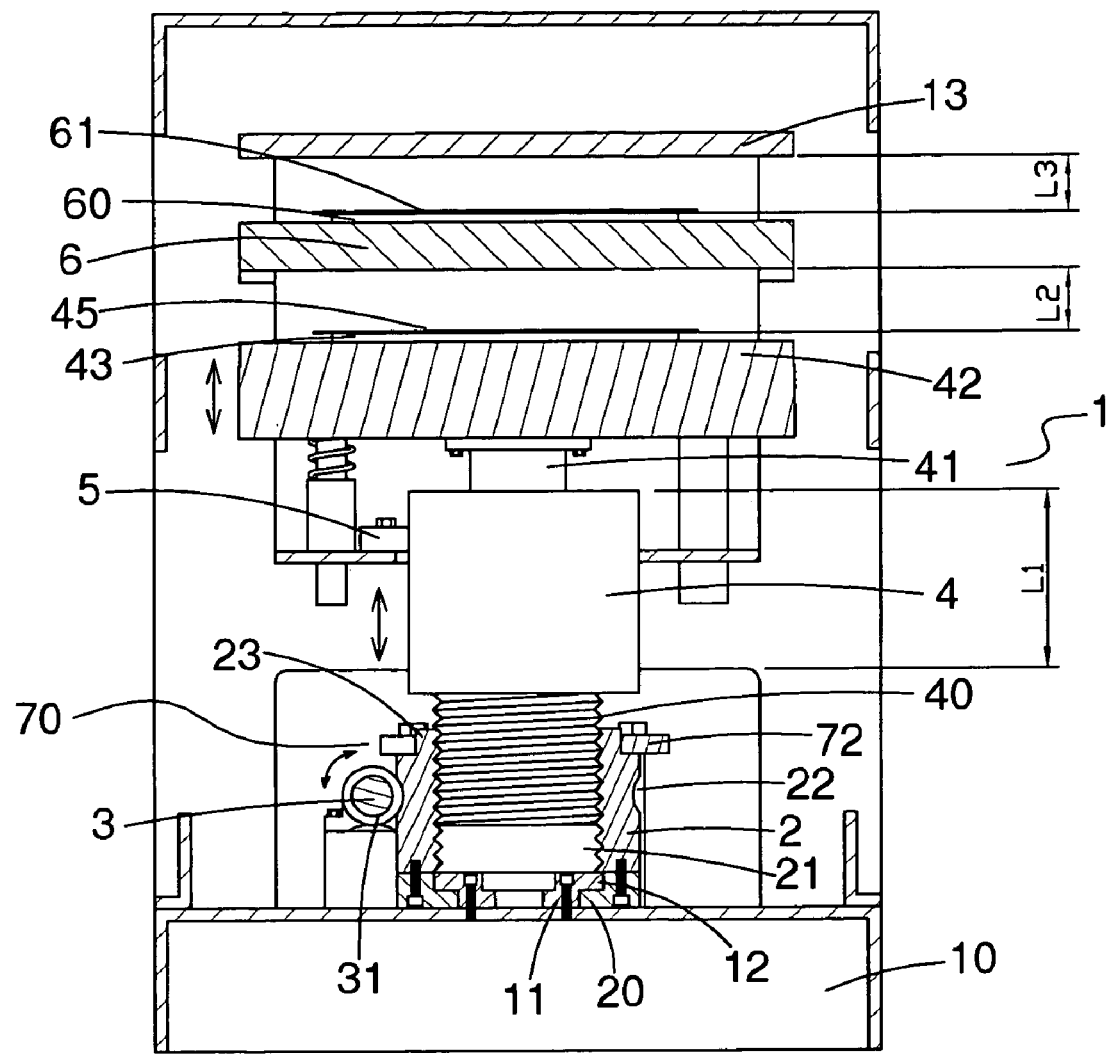
FIG. 5 is a cross sectional view of the embodiment.
Figure 6:
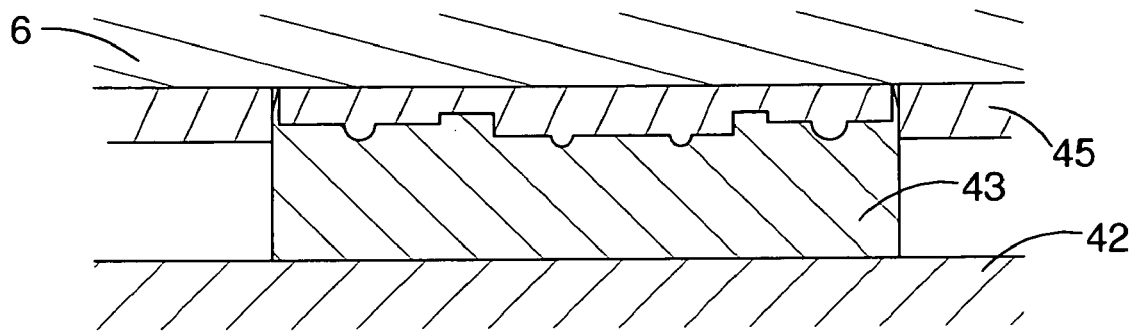
FIG. 6 is a cross sectional view showing a mold blade is pressed against the bottom of the upper mold stage.

The hydraulic cylinder 4 is powered by a hydraulic system and it extends its stretchable rod 41 to move the second mold stage 42 upwardly to press against the bottom of the third mold stage 6 (The moving distance is shown as L2 in FIG. 5). Thereafter, the third mold stage 6 pushed by the second mold stage 42 and moves upwardly to press against the bottom of the first mold stage 13 (the moving distance is show as L3 in FIG. 5). The mold stages are heated to melt the workpieces 45, 61. Since the first mold stage 13 is fixed at the frame of the machining apparatus 1, the second workpiece 45 and the third workpiece 61 are pressed between the mold stages 42, 6, 13 and the second mold blade 43 then form patterns on the second workpiece 45 and cut the edge of the second workpiece 45 in shape as shown in FIG. 6. The third mold blade 60 forms patterns on the third workpiece 61 and cut the third workpiece 61 in shape.

The stretchable rod 41 of the hydraulic cylinder 4 has a fixed full stretching distance, which is equal to the distances L2 plus L3 as shown in FIG. 5. For each operation of the instant invention, the hydraulic cylinder 4 extends its stretchable rod 41 to its full stretching distance. Different mold blades 43, 60 with different heights are fit for different workpiece with different thickness. The instant invention can precisely form and cut the workpieces and also prevent the mold stages 42, 6, 13 from over-pressed damages by adjusting the altitude of the hydraulic cylinder 4.

When the hydraulic cylinder 4 need to be raised, the motor 30 is turned on and the spiral rod 3 with spiral teeth 31 is driven by the motor 30. The spiral teeth 31 engages with the teeth 22 of the gear 2. The gear 2 then rotates around the center thereof. Since the threaded hole 21 is engaged with the threaded portion 40 of the hydraulic cylinder 4 and the hydraulic cylinder 4 is limited to move only vertically by the restriction means 5. After the hydraulic cylinder 4 is adjusted to desired altitude (the moving distance is shown as L1), a user then starting the hydraulic system of the hydraulic cylinder. The stretchable rod 41 is then extended to its full distance and thereby proceeds the workpiece machining process.

Figure 9:
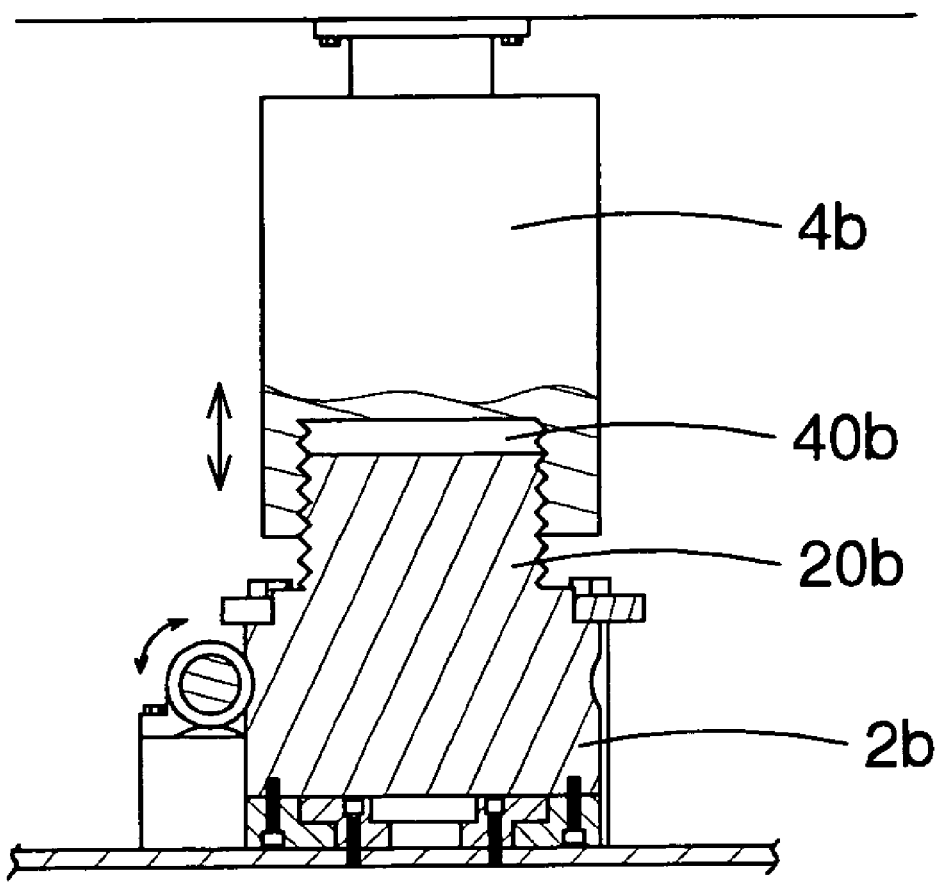
FIG. 9 is a cross sectional view of another embodiment of the present invention showing a hydraulic cylinder is engaged with a extruded threaded portion of a gear.
Figure 10:
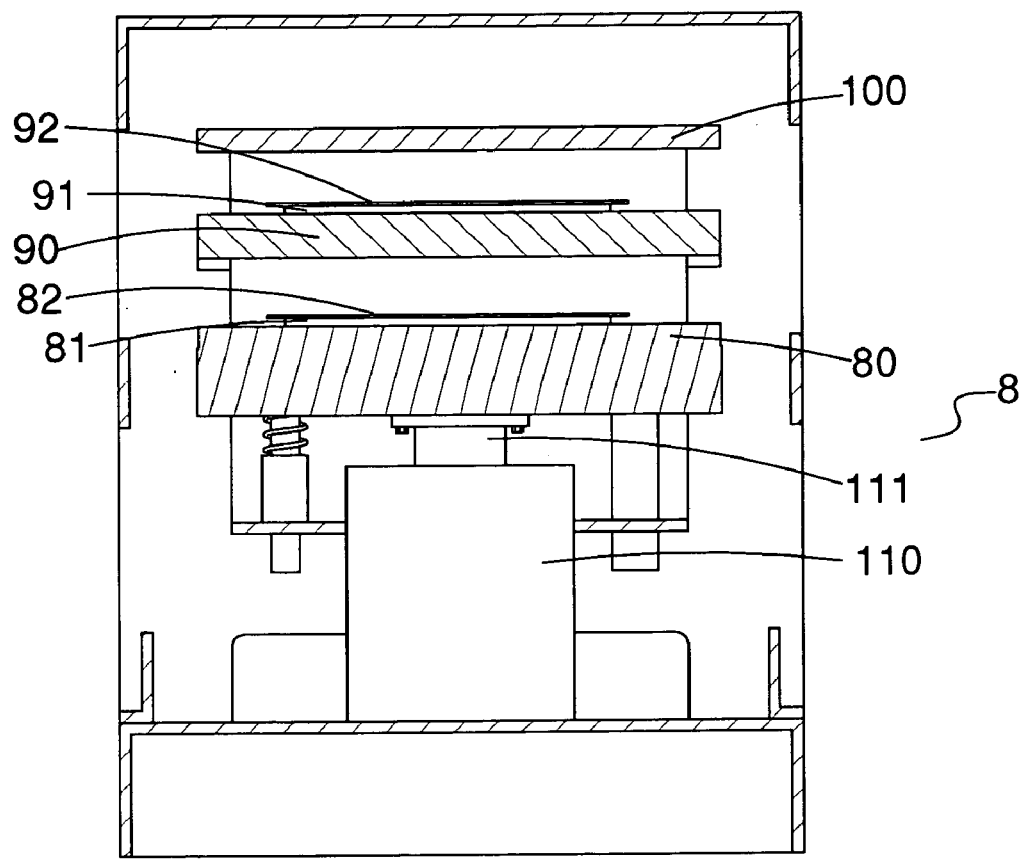
FIG. 10 is cross sectional view of a conventional machining apparatus.

Another embodiment of the present invention is illustrated in FIG. 9. The second embodiment has the same structure of the first embodiment stated above except the parts of the gear and hydraulic cylinder. The gear 2d contains a extruded threaded portion 20b at the upper end thereof. The hydraulic cylinder 4b contains a threaded hole 40b therein. The threaded extruded portion 20b is engaged with the threaded hole 40b. When the gear 2b is driven by a motor and rotates, the hydraulic cylinder 4b moves vertically to desired position.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extend indicated by the broad general meaning of the terms in which the appended claims are expressed.

What is claimed is:

1. A machining apparatus comprising:
 a hydraulic cylinder having a displaceable rod at an upper end thereof;
 means for adjusting a height of said hydraulic cylinder engaged with said hydraulic cylinder at a lower portion thereof, said means for adjusting a height of said hydraulic cylinder including (a) a gear having teeth on an outer surface thereof and a threaded hole therein, and (b) a spiral rod having spiral teeth formed thereon and engaged with said teeth of said gear, said spiral rod being driven by a motor;
 means for restraining said hydraulic cylinder to move only vertically;
 a base;
 a seat having a flange at an upper portion, said seat is mounted to said base; and
 a ring surrounding said seat, said ring being mounted to said gear.

2. The machining apparatus of claim 1, wherein said means for restraining said hydraulic cylinder includes a plate fixed on a frame of said machining apparatus, said plate having a flat surface thereon,
 wherein said hydraulic cylinder has a flat surface, said flat surface of said plate being engaged with said flat surface of said hydraulic cylinder.

3. The machining apparatus of claim 1, wherein said means for restraining said hydraulic cylinder includes a plate fixed on a frame of said machining apparatus, said plate having a groove at one side,
 wherein said hydraulic cylinder has a rail thereon, said rail being engaged with said groove.

4. The machining apparatus of claim 1, further comprising: a holding device, said gear having a stage formed on a top thereof, said holding device having plural pillars fixed on said base and a holding ring mounted with said pillars holding said stage of said cylinder.

5. A machining apparatus comprising:
 a base;
 a seat having a flange at an upper portion, said seat is mounted to said base;
 a ring surrounding said seat;
 a gear having teeth at an outer surface thereof and a threaded hole therein, said gear is mounted with said ring;

a spiral rod having spiral teeth at one end, said spiral teeth are engaged with said teeth of said gear, said spiral rod is driven by a motor;

a hydraulic cylinder having a displaceable rod at an upper end thereof and a threaded portion at a lower outer end thereof, said threaded portion is engaged with said threaded hole; and means for restraining said hydraulic cylinder to move only vertically.

6. The machining apparatus of claim 5 wherein said meanings for restraining said hydraulic cylinder comprises:

a plate fixed on a frame of said machining apparatus, said plate has a flat surface thereon, wherein said hydraulic cylinder has a flat surface, said flat surface of said plate engage with said flat surface of said hydraulic cylinder.

7. The machining apparatus of claim 5 wherein said meanings for restraining said hydraulic cylinder comprises:

a plate fixed on a frame of said machining apparatus, said plate has a groove at one side, wherein said hydraulic cylinder has a rail thereon, said rail is engaged with said groove.

8. The machining apparatus of claim 5 further comprising: a mold stage having a molding blade installed thereon, said mold stage is mounted on top of displaceable rod of said hydraulic cylinder.

9. The machining apparatus of claim 5 further comprising: a holding device, and said gear has a stage formed on a top thereof, said holding device having plural pillars fixed on said base and a holding ring mounted with said pillars and holding said stage of said cylinder.

10. A machining apparatus comprising:

a base;

a seat having a flange at an upper portion, said seat being mounted to said base;

a ring surrounding said seat;

a gear having teeth on an outer surface thereof and a threaded portion extending from a top end thereof, said gear being mounted to said ring;

a spiral rod having spiral teeth at one end, said spiral teeth being engaged with said teeth of said gear, said spiral rod being driven by a motor;

a hydraulic cylinder having a displaceable rod at an upper end thereof and a treaded hole formed therein, said threaded hole being engaged with said threaded portion of said gear; and means for restraining said hydraulic cylinder to move only vertically.

* * * * *